United States Patent [19]

Lönne et al.

[11] Patent Number: 4,962,939
[45] Date of Patent: Oct. 16, 1990

[54] CYLINDER HEAD GASKET HAVING OVERLAYS IN END ZONES

[75] Inventors: Klaus Lönne; Klaus-Peter Majewski, both of Burscheid; Karl-Heinz Maus, Remscheid; Franz-Josef Giesen, Odenthal, all of Fed. Rep. of Germany

[73] Assignee: Goetze AG, Burscheid, Fed. Rep. of Germany

[21] Appl. No.: 711,444

[22] Filed: Mar. 12, 1985

[30] Foreign Application Priority Data

Mar. 17, 1984 [DE] Fed. Rep. of Germany ....... 3409952

[51] Int. Cl.⁵ ............................................. F16J 15/10
[52] U.S. Cl. ........................... 277/235 B; 277/235 R; 277/DIG. 6
[58] Field of Search ........... 277/235 B, 235 A, 235 R, 277/227, DIG. 6, 235 B

[56] References Cited

U.S. PATENT DOCUMENTS

| | | | |
|---|---|---|---|
| 3,433,490 | 3/1969 | Teucher et al. | 277/235 B X |
| 3,794,333 | 2/1974 | Czernik et al. | 277/235 B X |
| 3,950,576 | 4/1976 | Desuercherf | 277/235 B X |
| 3,970,322 | 7/1976 | Stecher et al. | 277/235 B |
| 4,284,282 | 8/1981 | Lonne | 277/235 B |
| 4,428,590 | 1/1984 | Pippert et al. | 277/188 A |
| 4,434,989 | 3/1984 | Beyer et al. | 277/235 B |
| 4,462,615 | 7/1984 | Ulmer et al. | 277/235 B |

FOREIGN PATENT DOCUMENTS 2930715 3/1981 Fed. Rep. of Germany ... 277/235 B

Primary Examiner—Allan N. Shoap
Attorney, Agent, or Firm—Spencer & Frank

[57] ABSTRACT

A flat sealing gasket includes a mat of non-woven material having opposite faces; a polymerized impregnating agent distributed with the material and an overlay on at least one of the mat faces. The overlay which comprises a hardened, pressure-resistant polymer material is sunken into the mat to a substantial extent of the mat thickness.

11 Claims, 1 Drawing Sheet

CYLINDER HEAD GASKET HAVING OVERLAYS IN END ZONES

BACKGROUND OF THE INVENTION

This invention relates to a flat sealing gasket made of a soft material, particularly a cylinder head gasket for internal combustion engines and is of the type which has an impregnated, non-woven mat which may be metal-reinforced and which has overlays on the sealing faces on one or both sides of the mat The polymerized impregnating agent which fills the pores of the non-woven mat to an extent of 60 to 90% by volume serves essentially for increasing the cross-sectional density and the strength of the mat.

The overlays serve for increasing the sealing pressure. Such overlays are profiled, raised annular parts which are made of elastically deformable material and which surround the gasket openings for the combustion chambers and/or for the fluid ports. In the areas where the overlays are provided, an improved seal is obtained because of the increased sealing pressure and further because the overlays elastically conform to the sealing faces. Similarly, annular, cross-sectionally approximately U-shaped frames may be inserted about the sealing edges of the gasket openings. Such frames, in addition to protecting the edges of the openings, also increase the sealing pressure and thus the sealing effect by virtue of their raised, profiled configuration.

If, upon installing the cylinder head gasket between the engine block and the cylinder head, only a relatively small tightening force is applied which clamps the two engine components to one another, only the profiled overlays are placed under stress, while the sealing mat itself is loaded less, so that it performs essentially only a carrier function. Such non-uniform stresses may lead, during engine service, to the destruction of the overlays and to heat-caused deformations in the running faces of the cylinders. In case higher tightening forces are applied, the elastic overlays and the corresponding soft material zones of the mat are, during engine operation, stressed beyond their elastic limit which results in a flow of the soft material and the overlays, whereupon permanent plastic deformations or their destruction occurs, and thus the desired increase in the sealing pressure will not be obtained.

During the operation of the internal combustion engine, particularly during engine start, a rapid heating and non-uniform heat distribution occur, particularly in the vertical direction from the combustion chambers. Such non-uniform heat distribution leads, similarly to a bimetal effect, to thermal misalignment (deformations) of the surfaces to be sealed. To provide for a compensation, the cylinder head is clamped to the cylinder block with non-uniformly distributed tightening force, so that, as a result, the gasket is exposed to non-uniform sealing pressure forces. The sealing pressure forces which are increased in certain areas, counteract the thermal deformations of the sealing faces and risks of a deformation, particularly in the sealing faces of the cylinder head are avoided.

According to German Patent No. 1,074,341 the non-uniform sealing pressure force affecting the gasket is obtained by deformation characteristics which are non-uniformly distributed over the gasket. This is achieved by the fact that the gasket has different thicknesses in different areas and different capacity to receive the impregnating agent in different areas or the impregnating agent is polymerized to a different extent in the different areas. In other constructions, the gaskets have depressions in order to concentrate the pressure on predetermined zones of the sealing face. Nevertheless, the thermal deformations of the sealing faces of the cylinder head are in most cases of such an extent that in order to effect a compensation, the gasket has to be stressed in those zones with extremely high pressure forces which, even if the gasket is constructed according to German Patent No. 1,074,341, stress the gasket in certain zones beyond the flow limit of the soft material and thus a permanent plastic deformation of the soft material results and the desired bias is not obtained.

SUMMARY OF THE INVENTION

It is an object of the invention to provide an improved soft-material sealing gasket, such as a cylinder head gasket in which, particularly for the purpose of compensating for the thermal deformations in the sealing faces of the cylinder head during engine operation, certain gasket zones may be permanently exposed to an increased tightening force applied during installation without the risks of destruction by plastic deformation or by the flowing of the material.

These objects and others to become apparent as the specification progresses, are accomplished by the invention, according to which, briefly stated, the overlays of the gasket are of a pressure-resistant polymer material, and the overlays are, after applying them to the gasket and after hardening, entirely or partially sunken into the gasket by applying an external pressing force.

After applying the overlays to the mat surface, hardening the overlays and pressing them into the mat, the gasket is soaked with an impregnating agent. During impregnation the mat portions underneath the overlays are protected by the overlays and such mat portions thus remain essentially free from the inflowing impregnating agent.

It was found that as a pressure-resistant polymer for the overlay particularly an epoxy resin is advantageous which contains, as a reinforcing filler, between 30 and 80% by weight inorganic, fine-grained or powdery additives such as preferably metal oxides, silicates and/or barium sulfate. For increasing the pressure resistance, as reinforcing fillers solid synthetic resin powders such as PTFE powders or inorganic or organic short fibers may be used individually or as a mixture with the other fillers. The thickness of the overlays which may be applied to one or both sides of the mat is between 0.01 and 0.2 mm and thus constitutes approximately 1% to 10% of the total thickness of the gasket. In case of a multi-cylinder in-line motor, the overlays are arranged preferably in the two end zones of the gasket (on one or both sides thereof). In this manner a deformation (bulging) of the sealing face of the cylinder head and the engine block may be particularly efficiently counteracted. The optimal location and size of the overlays are, however, determined case by case.

For making the overlays according to the invention, liquid epoxy resin, containing the filler additives, is applied in a screen printing or template printing process to the stamped-out gasket mat blank. Thereafter, the epoxy resin is preferably thermally hardened and the overlays are, preferably by rolling or pressing, embedded (sunken) into the gasket, leaving a raised portion, if desired. Thereafter, the impregnation of the gasket and the polymerization of the impregnating agent as well as the finishing operations are performed in a conventional manner.

It has been found that the gasket, in the zone of the overlays provided according to the invention, may be stressed with extremely high pressures which may be as much as approximately ten times greater than the pressing forces in the other zones of the gasket without causing destruction or flow of the overlays and the soft material situated thereunder. The epoxy resin which is reinforced by filler additives and which constitutes the overlays is behaving in a stable manner when exposed to high pressures and to the impregnating agent. The soft material underneath the overlays is compressed by pressing in the overlays and is protected from the impregnating agent so that its flow limit is significantly greater than the flow limit of the neighboring impregnated mat zones. Thus, the invention provides a flat sealing gasket which may be installed such that the clamping forces are distributed over the gasket surface with significant pressing force differences.

By arranging the overlays precisely in those zones of the gasket where the sealing faces of the cylinder head would bulge under the effect of thermal deformations, the higher sealing pressure force applied during installation counteracts the deformation of the cylinder head and, as a result, no such deformation will occur. Thus, the invention provides for an effective compensation of thermal deformations and is simple and inexpensive to manufacture.

DESCRIPTION OF THE PREFERRED EMBODIMENT

Figure 1:
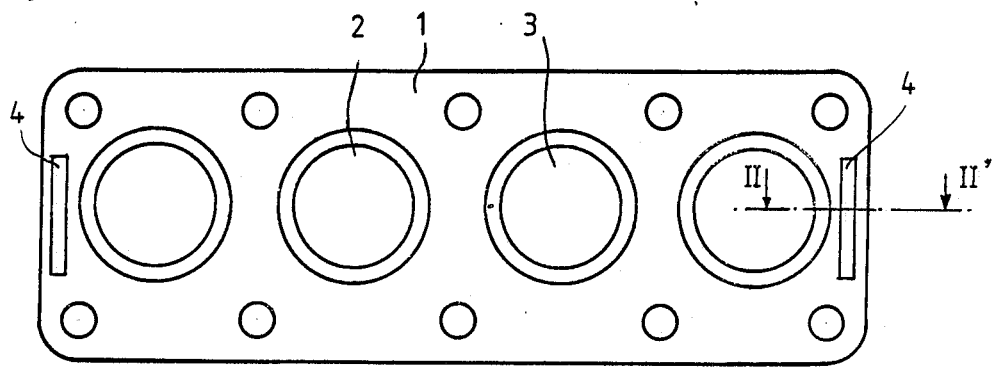
FIG. 1 is a top plan view of a cylinder head gasket incorporating the invention.

Turning to FIG. 1, there is shown a cylinder head gasket 1 for a four-cylinder in-line engine. The gasket 1 is provided with combustion chamber openings 3, each framed by annular reinforcements 2. At opposite ends of the cylinder head gasket 1 there are provided reinforced epoxy resin overlays 4 which have a high pressure resistance.

Figure 2:
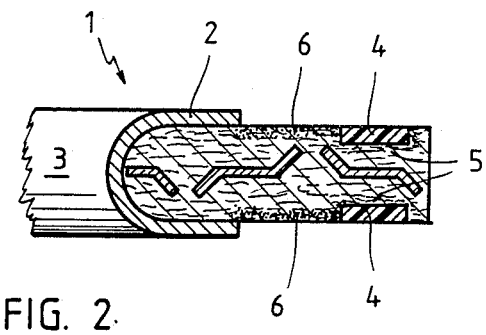
FIG. 2 is an enlarged sectional view taken along line II—II of FIG. 1.

As seen in FIG. 2, the overlays 4 are provided on both sides of the gasket and were, in the manufacturing process, fully pressed into the mat material. During subsequent impregnation of the cylinder head gasket the compressed soft material zone 5 underneath the overlays 4 remains free from the impregnating agent 6.

It will be understood that the above description of the present invention is susceptible to various modifications, changes and adaptations, and the same are intended to be comprehended within the meaning and range of equivalents of the appended claims.

What is claimed is:

1. In an elongated cylinder head gasket including a mat of non-woven material having opposite faces each having two opposite end zones at opposite longitudinal ends of the gasket; a polymerized impregnating agent distributed within the material and an overlay on at least one of said faces; the improvement wherein said overlay comprises a hardened, pressure-resistant polymer material having a thickness; said overlay being sunken into said mat to a substantial extent of said thickness and being provided on at least one face in at least one said end zone.

2. A cylinder head gasket as defined in claim 1, wherein zones of said mat underneath said overlay are in a compressed state and are substantially free from said impregnating agent.

3. A cylinder head gasket as defined in claim 1, wherein said pressure-resistant polymer material is an epoxy resin having 30% to 80% by weight of at least one reinforcing filler.

4. A cylinder head gasket as defined in claim 3, wherein at least one filler is a powdery-to-fine grain mineral material.

5. A cylinder head gasket as defined in claim 3, wherein at least one filler is a powdery-to-fine grain synthetic resin.

6. A cylinder head gasket as defined in claim 3, wherein at least one filler is selected from the group consisting of organic and inorganic short fibers.

7. A cylinder head gasket as defined in claim 1, wherein the thickness of said overlay is 1% to 10% of the total thickness of said gasket.

8. A cylinder head gasket as defined in claim 1, wherein the thickness of said overlay is between 0.01 and 0.2 mm.

9. A cylinder head gasket as defined in claim 1, wherein said overlay is coplanar with the gasket face on which it is provided.

10. A cylinder head gasket as defined in claim 1, wherein a separate said overlay is provided in each said end zone.

11. A cylinder head gasket as defined in claim 10, wherein said mat has a generally rectangular shape; each overlay has an elongated, linear shape extending adjacent and parallel to respective sides bounding said opposite end zones.

* * * * *